No. 885,009.  
PATENTED APR. 21, 1908.  
B. A. BEHREND.  
INDUCTION MOTOR.  
APPLICATION FILED NOV. 29, 1905.

WITNESSES:  
INVENTOR:  
Bernard A. Behrend.  
By  
Chas. E. Lord  
ATTORNEY.

UNITED STATES PATENT OFFICE.

BERNARD ARTHUR BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

INDUCTION-MOTOR.

No. 885,009.    Specification of Letters Patent.    Patented April 21, 1908.

Application filed November 29, 1905. Serial No. 289,551.

*To all whom it may concern:*

Be it known that I, BERNARD ARTHUR BEHREND, citizen of the United States, residing at Norwood, in the county of Hamilton and State of Ohio, have invented certain new and useful Improvements in Induction-Motors, of which the following is a full, clear, and exact specification.

My invention relates to induction motors and particularly to the rotary members thereof having windings of the squirrel-cage type.

The object of my invention is to provide a rotor, the parts of which will be easy to manufacture and to assemble, and which will be strong, durable, and compact, and I aim further to improve, in general, the design of such members.

I provide at each side of the spider of the rotor and preferably integral therewith, fan-blades, and mount on the outer surface of these blades short-circuiting rings for the conductor-bars.

My invention consists in certain novel arrangements of parts and combinations of elements more clearly described in the specification and definitely set forth in the appended claims.

Figure 1:
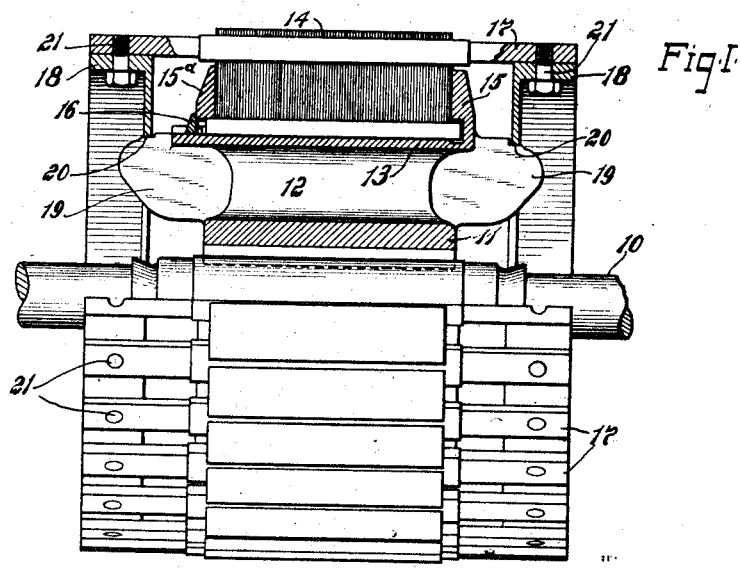
Figure 2:
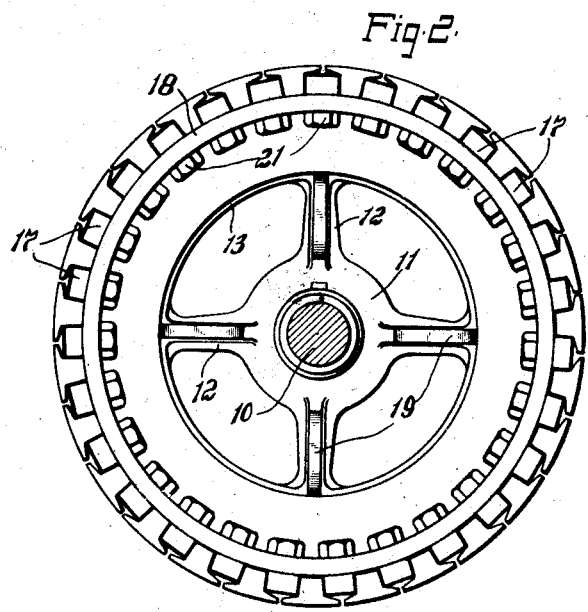

For a better understanding of my invention, reference is had to the accompanying drawing, in which, Figure 1 is a side elevation of my improved rotor, parts being in section for the sake of clearness; and Fig. 2 is an end view of the same.

I have shown at 10, the shaft upon which the spider of the rotor is mounted. The spider consists of a hub 11, radial arms 12, and an outer rim 13 which supports the laminated core 14. The laminæ of the core are secured to the rim in any desired manner and are held between end-plates 15 and 15ª, the former of which is integral with the frame. The laminæ and plate 15ª are held in place by a split holding ring 16. The core is provided with the usual slots for receiving the conductor-bars 17, which, together with the short-circuiting rings 18, form a squirrel-cage winding. The conductors 17 and short-circuiting rings 18 are made of copper or other good conducting material.

Integral with the spider, in this case with the arms 12, on each side of the rotor are a number of radial, outwardly projecting fan-blades 19. The outer portions of these blades are machined for a short distance to form bearing surfaces 20. Mounted on the outer surfaces of the blades and on the machined portions are the short-circuiting rings 18. As shown clearly in Fig. 1, each ring is L-shaped in cross section or provided with two surfaces at right angles to each other. One of these sides or surfaces engages the fan-blades and the other supports and is connected to the outer ends of the rotor conductors 17. As is shown, the conductors extend a considerable distance beyond each side of the core of the rotor, and are securely fastened to the rings 18 by screws 21. It will be seen that by means of the fans 19, all parts will be well cooled, and that the structure is compact, firm and easily assembled.

I do not wish to be confined to the exact structure shown, but I aim in my claims to cover all modifications which do not depart from the spirit and scope of my invention.

What I claim as new and desire to secure by Letters Patent is:—

1. In a rotor for induction motors, a spider, radial fan-blades integral with said spider, a slotted core mounted on the rim of the spider, conductors mounted in the slots of the core, and short-circuiting rings for said conductors mounted on said fan-blades.

2. In an induction motor, a shaft, a spider comprising a hub, radial arms and a rim, a slotted core mounted on said rim, conductors located in the slots of the core and extending beyond each side thereof, fan-blades integral with the arms of the spider and extending from each side thereof, and short-circuiting rings for the conductors resting on the outer surface of the fan-blades.

3. A rotor for alternating current dynamo-electric machines, comprising a core supporting member, a laminated core on said supporting member, fan-blades on said supporting member, conductors carried by said core and having their ends extending beyond the sides of said core, and short-circuiting rings for said conductors mounted upon said fan-blades and spaced from said core so as to permit free radial movement of air between the core and short-circuiting rings.

4. In an induction motor, a rotor spider, a slotted core, conductors located in the slots of the core and extending beyond each side thereof, fan-blades integral with the arms of the spider and extending from each side thereof, and short-circuiting rings for the conductors mounted on the fan-blades, each of said rings having a vertical portion parallel to the core and spaced therefrom to form a ventilating passageway between the rings and core, said portion engaging the fan-blades.

In testimony whereof I affix my signature, in the presence of two witnesses.

BERNARD ARTHUR BEHREND.

Witnesses:
LAURA E. WELCH,
ARTHUR F. KWIS.